Dec. 3, 1968             F. R. SAVORY             3,414,200
VEHICLES FOR SPREADING DISCRETE MATERIALS
Filed Jan. 11, 1967                                    5 Sheets-Sheet 3
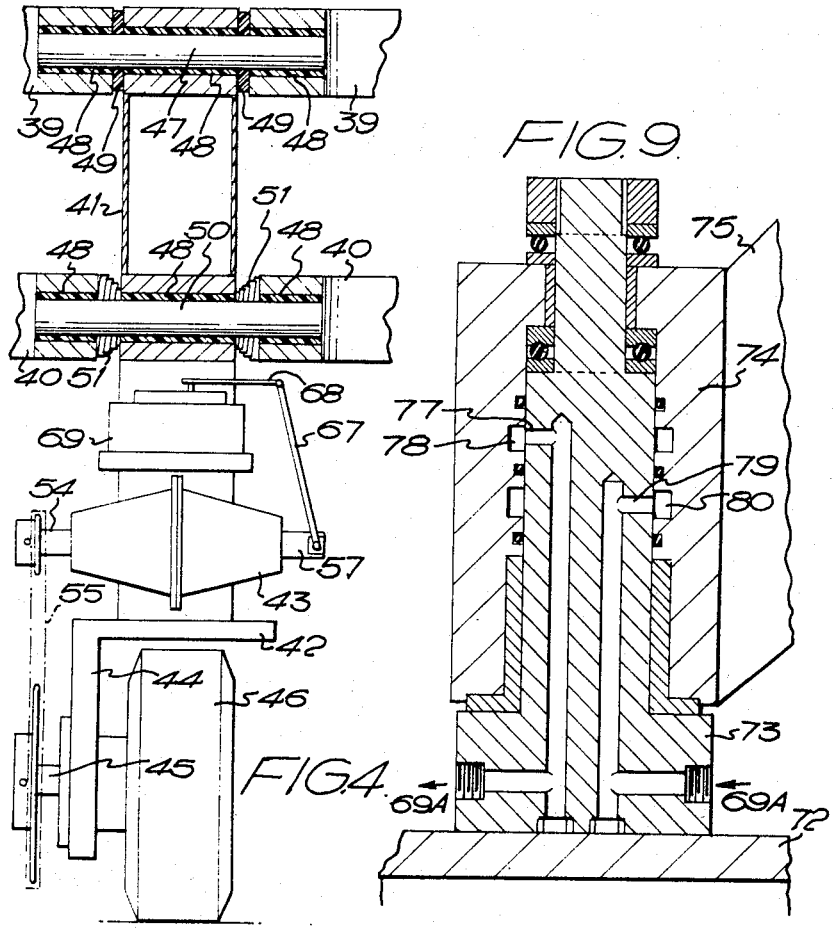
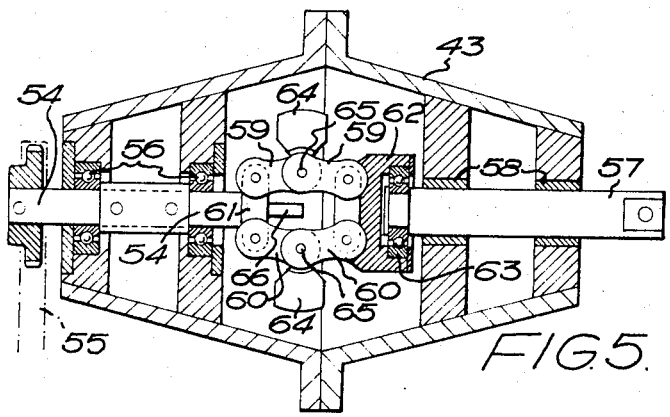
INVENTOR
Frederick Ralph Savory
BY
Watson, Cole, Grindle & Watson
Attorneys Dec. 3, 1968    F. R. SAVORY    3,414,200
VEHICLES FOR SPREADING DISCRETE MATERIALS
Filed Jan. 11, 1967    5 Sheets-Sheet 5
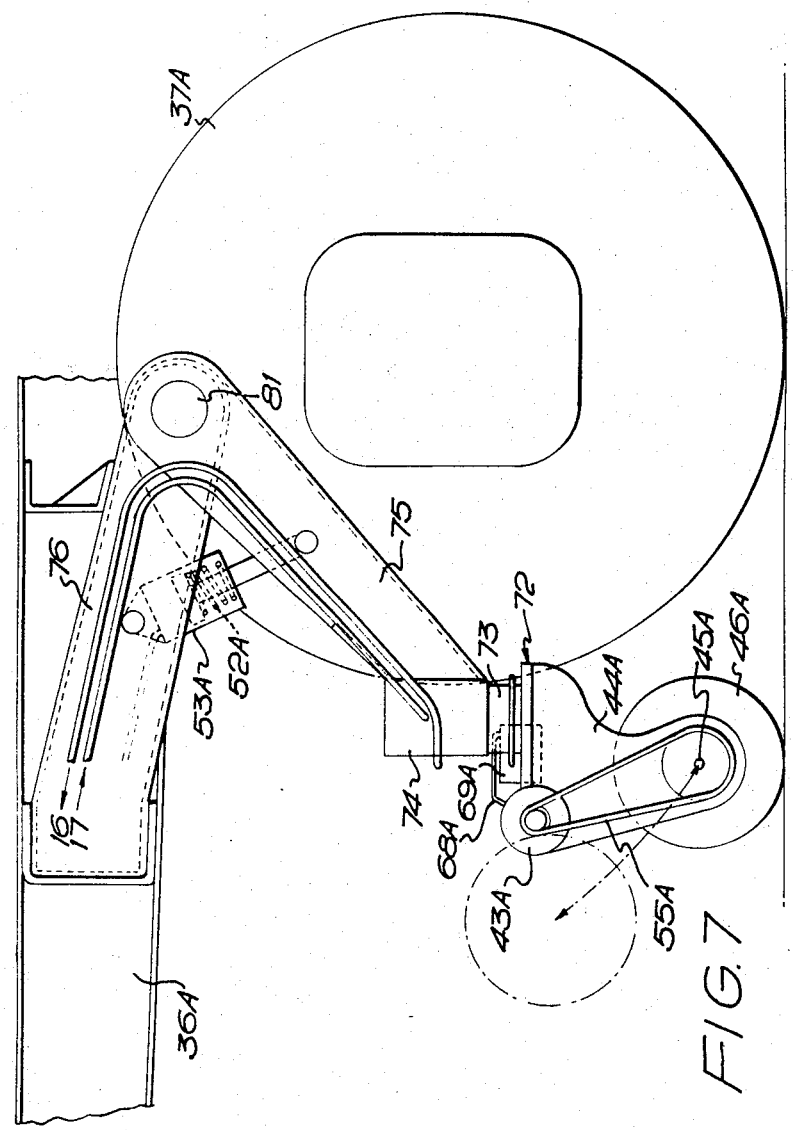
INVENTOR
Frederick Ralph Savory
BY
Watson, Cole, Grindle & Watson
Attorneys

United States Patent Office 3,414,200
Patented Dec. 3, 1968

3,414,200
VEHICLES FOR SPREADING DISCRETE MATERIALS
Frederick Ralph Savory, Sutton-in-Ashfield, Nottinghamshire, England, assignor to Steel Construction & Engineering Co. (Notts) Limited
Filed Jan. 11, 1967, Ser. No. 608,569
Claims priority, application Great Britain, Jan. 13, 1966, 1,619/66
14 Claims. (Cl. 239—673)

ABSTRACT OF THE DISCLOSURE

Control means for a hopper vehicle with discharging means for spreading discrete material over road or other ground surfaces comprises a control wheel resiliently urged into contact with the road or other ground surface during spreading and driving a governor controlling the speed of independent drive means for the discharging means, the control wheel being mounted for limited transverse movement with respect to the vehicle in response to other than straight forward movement of the vehicle, whereby the discharging means is driven strictly in accordance with the general rate of travel of the vehicle and, accordingly, the density of distribution of the material can be maintained at the predetermined optimum density under any road, weather and traffic conditions.

---

This invention relates to the spreading of discrete materials, more particularly to the spreading of salt and/or grit over road or other ground surfaces under wintry conditions, but is equally applicable to the spreading of sand or grit to combat sticky conditions on road surfaces in hot weather or adaptable for agricultural purposes such as the spreading of lime.

The usual way of spreading discrete material is from a hopper vehicle with discharging means driven at constant speed or driven from the land wheels of the vehicle. With constant speed discharging means, uniform distribution of the material at the optimum density (weight of material required per unit area of surface to be covered) calls for a uniform speed of the vehicle, which is difficult to maintain under changing road, weather and traffic conditions. On the other hand, with discharging means driven from the land wheels of the vehicle, any slipping or skidding of the vehicle causes a change in the density of the material. Particularly in the case of salting icy road surfaces, with or without gritting, any excess of material over optimum density is a waste because it affords no added improvement in the road conditions, while any lack in density results in failure to achieve any appreciable improvement in road conditions.

The object of the present invention is to provide a hopper vehicle with discharging means for spreading discrete material over road or other ground surfaces with control means whereby the optimum density of distribution of the material can be maintained.

According to the present invention, control means for a hopper vehicle with discharging means for spreading discrete material over road or other ground surfaces comprises a wheel with mounting permitting limited transverse movement with respect to the vehicle in response to other than straight forward movement of the vehicle and adapted to be resiliently urged into contact with the road or other ground surface during spreading, and a governor driven by the control wheel and controlling the speed of independent drive means for the discharging means.

Because the control wheel has only the governor to drive, only slight frictional contact is required between the control wheel and the road or other ground surface. Thus, the control wheel and the governor can operate efficiently even with very low coefficients of friction on the surface and despite any slipping of the land wheels.

The control wheel may be a castor wheel, so that the castor mounting enables the control wheel to align itself with the general direction of movement of the vehicle at any instant, so that regardless of any skidding of the vehicle or any other change in its direction of travel, the discharging means is driven strictly in accordance with the general rate of travel of the vehicle. Accordingly, the density of distribution of the material can be maintained at the predetermined optimum density under any road, weather and traffic conditions. Alternatively, and with generally similar effect, the control wheel may be on a transverse axis on a bracket mounted to afford freedom of movement of the control wheel substantially along that axis, with springs to urge the control wheel towards a central position. A castor wheel is convenient for mounting direct from the chassis of a hopper vehicle, while an axially movable control wheel is most convenient for mounting from a self-contained spreading unit (comprising a hopper and discharging means) for mounting on the platform of a lorry.

The control wheel is preferably carried by a bracket adapted to be raised to bring the control wheel clear of the ground, when the vehicle is merely transporting its load or is travelling empty, and the bracket is preferably spring-loaded towards raised position, the resilient urge on the control wheel towards the road or other ground surface being provided by hydraulic or pneumatic means, e.g., a hydraulic or pneumatic ram with a spring return.

Conveniently, the discharging means is driven by a hydraulic or pneumatic motor the control valve of which is actuated by the governor, the supply to the motor being from a pump driven by the engine of the vehicle or, if preferred, by a separate engine or motor.

The discharging means may include a metering device feeding the material from the hopper direct on to the road, the width over which the material is spread being the same as the width of the metering device. Alternatively, the discharging means may include a metering device feeding the material from the hopper to a spreading device for distributing the material over a width exceeding the width of the metering device.

The metering device may be or may include an adjustable gate at or near the discharge end of the hopper, the bottom of which may be inclined towards the discharge end or comprised by a conveyor belt, or the metering device may be or may include a pocketed roller with wipers or "doctors" for levelling off the material across the mouths of the pockets, or (preferably) it may be or may include a spiked roller with blunt spikes, minimising any tendency for damp salt or sand to stick to the roller—as is more frequently the case with a pocketed roller—with notched wipers or "doctors" for levelling off the material between the spikes.

The spreading device may consist of one or (preferably) two discs rotatable about vertical axes and provided with vanes for directing the material centrifugally beyond the edges of the discs. The spreading device is preferably driven by constant speed means, so that the material tends to be flung out to the same extent regardless of the quantity fed to it by the metering device, the density of distribution depending on the quantity fed by the metering device. Thus, with the metering device driven by a hydraulic or pneumatic motor and controlled by a governor operated valve, the spreading device may be driven by a constant speed hydraulic or pneumatic motor (as the case may be), with the same power source. The metering device preferably discharges into tubes or enclosed chutes for directing the material on to the spreading discs at the optimum position.

A self-contained spreading unit according to the invention for mounting on the platform of a lorry, and a castor control wheel for mounting direct from the chassis of a hopper vehicle according to the invention, will now be described, by way of example only, with reference to the accompanying drawings, in which FIGURES 1 to 3 are respectively a side elevation, rear elevation and plan of the self-contained spreading unit, shown in FIGURES 1 and 2 in relation to the platform and rear wheels of a lorry;

FIGURE 4 is a fragmentary front elevation partly in section of part of FIGURE 1;

FIGURE 5 is an axial section, to a larger scale, through the governor appearing in FIGURES 1 and 4;

FIGURE 7 is a fragmentary side elevation of the castor control wheel mounted direct from the chassis of a hopper vehicle;

FIGURE 9 is an axial section, to a larger scale, through the larger swivel block appearing in FIGURES 7 and 8.

Figure 1:
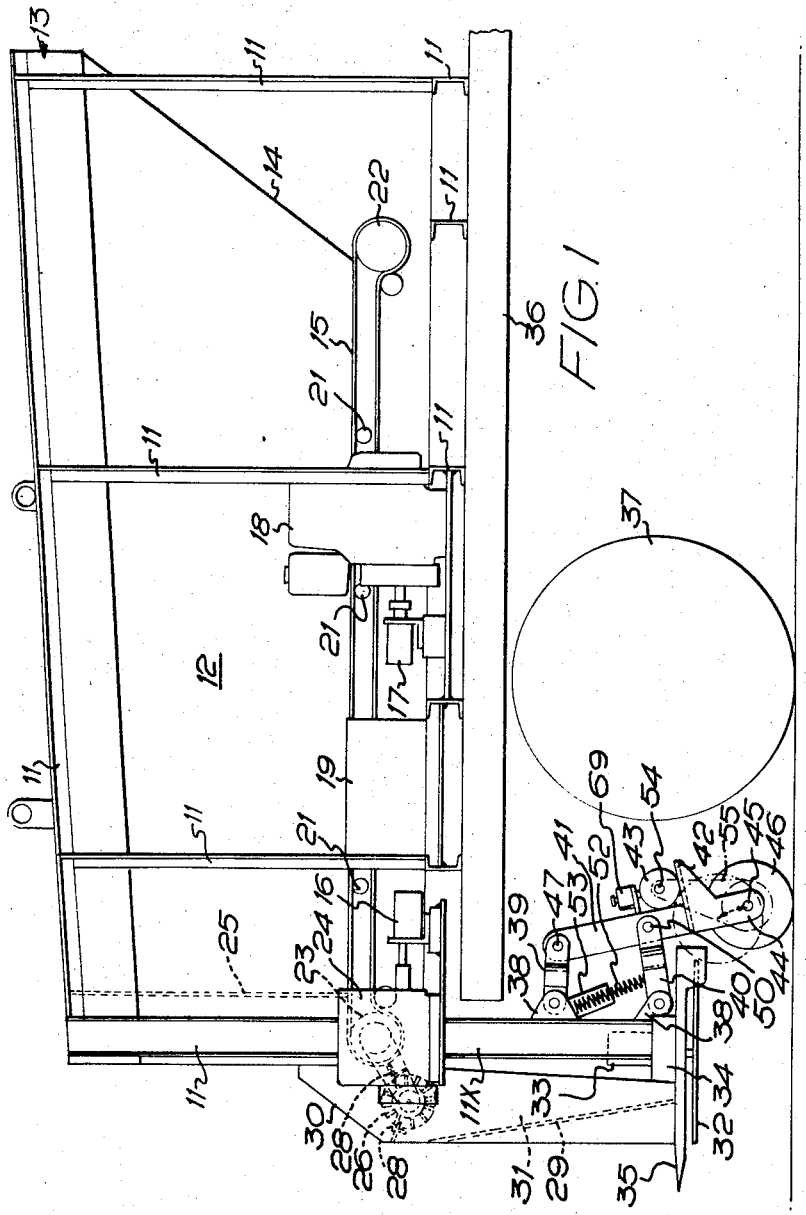
Figure 2:
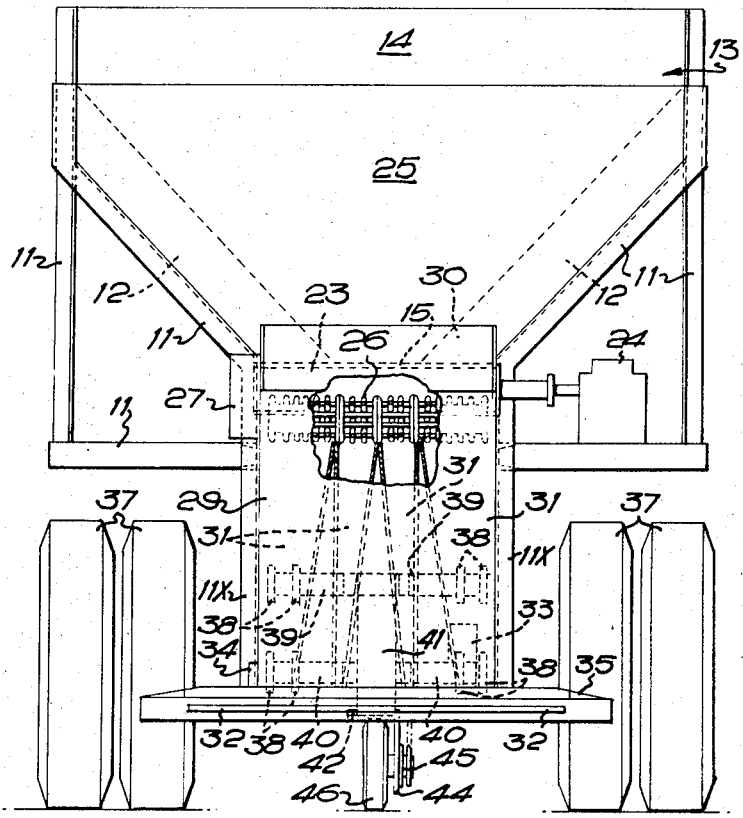
Figure 3:
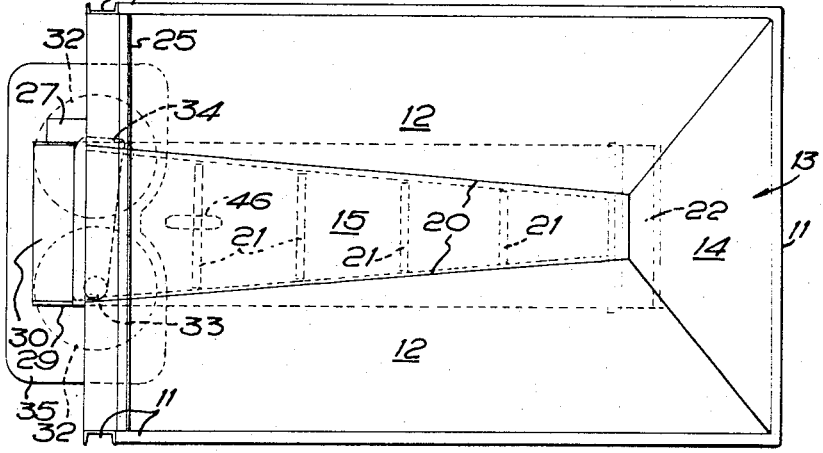

In FIGURES 1 to 3, framework 11 supports the sides 12 of a hopper 13 and its forward end 14, with the sides and front end sloping down to the upper run 15 of a conveyor belt forming the bottom of the hopper. The conveyor belt is driven by a hydraulic motor 16 supplied with oil from a pump 17 driven by an engine 18 and drawing from a tank 19, and the upper run 15 of the belt runs from front to rear of the hopper, the bottom edges 20 of the sides 12 of which diverge in this direction so as to reduce the load on the conveyor by reducing the tendency for salt and/or grit in the hopper to stick to sealing curtains (not shown) between the bottom edges 20 and the upper run of the belt. The upper run of the belt is supported by rollers 21 between forward and return drums 22, 23 respectively, the latter being driven by the motor 16 through a gearbox 24. A gate 25 is manually adjustable vertically (by screw means, not shown) to set the thickness of salt and/or grit discharge over the return drum 23.

A spiker roller 26 is driven by an enclosed chain drive 27 from the return drum 23, and the material discharged over the return drum falls on to the spiked roller 26 and is levelled off between the spikes by wipers or "doctors" 28 with notches for passage of the spikes. The spiked roller is enclosed within a casing 29 with an inspection cover 30, the casing also extending below the spiked roller around a battery of four chutes 31 for directing the material from the spiked roller on to spreading discs 32, one of which is driven directly by a hydraulic motor 33 and the other through an enclosed chain drive 34 above a hood guard 35 for the spreading discs.

Framework extensions 11X depend below the platform of a lorry 36 (the rear wheels of which are indicated at 37) and provide support for the spreading discs 32 and their drives 33, 34. The front of the casing 29 carries pivot blocks 38 for upper and lower pairs of arms 39, 40 respectively, supporting a bracket 41 having a platform 42 carrying a governor 43 and a single leg 44 with a cantilever axle 45 for a control wheel 46 (see also FIGURE 4). The upper pivot 47 for the bracket 41 has rubber bush bearings 48, and rubber washers 49 are interposed between the arms 39 and the bracket 41, to afford the bracket freedom to swing to a limited extent with the control wheel 46 moving substantially along the axis of its axle 45. The lower pivot 50 also has rubber bush bearings 48, and conical compression springs 51 are interposed between the arms 40 and the bracket 41 upwards to bring the control wheel 46 clear of the ground when the vehicle (i.e. the combination of lorry and self-contained spreading unit) is merely transporting its load or is travelling empty, the control wheel being urged resiliently towards the ground by a hydraulic ram 53.

The control wheel 46 drives the input shaft 54 of the governor 43 (see also FIGURE 5) through a chain drive 55, the shaft 54 being rotatably, but non-slidably mounted in ball-bearings 56 and connected to an output shaft 57, which is slidably but non-rotatably mounted in bushes 58 by pairs of toggle links 59, 60 between a crosshead 61 rotatable with the shaft 54 and a collar 62 rotatably, but non-slidably mounted on the shaft 57 by a ball-bearing 63. Governor weights 64, one on the common pivot 65 of each pair of toggle links, more outwardly under centrifugal forces when the shaft 54 is driven, and draws the shaft 57 inwardly, an extension 66 of the shaft 54 serving as a stop for the collar 62 to limit the inward movement of the shaft 57.

Figure 6:
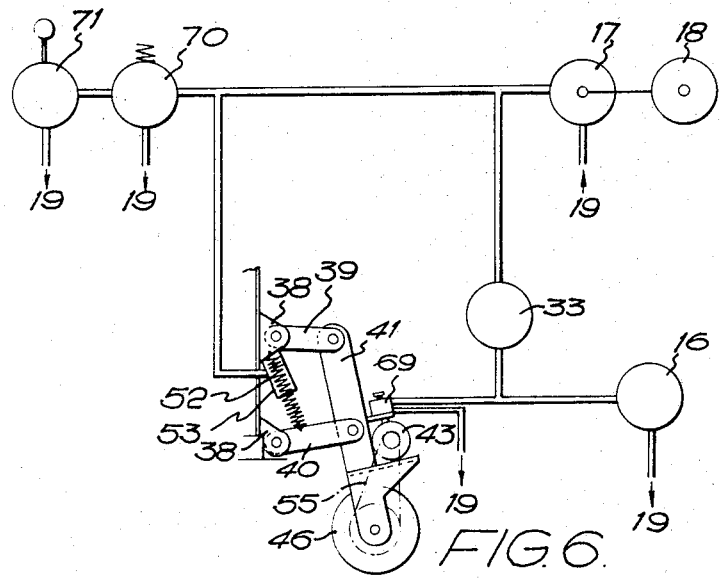
FIGURE 6 is a simplified hydraulic diagram.

The output shaft of the governor is linked by a lever 67 to an arm 68 actuating a control valve 69. As will be appreciated through reference to FIGURE 6, the control valve is normally urged (by a spring not shown) to open position, so as to by-pass the motor 16, so that while the motor 33 for the spreading discs may run continuously as long as the engine 18 is driving the pump 17, no material will be delivered to the discs unless the governor 43 is driven by the control wheel 46, to cause partial closing of the control valve in accordance with the speed of rotation of the control wheel. A spring-loaded relief valve 70 ensures maintenance of sufficient pressure by the pumps to operate the ram 53 to urge the control wheel into driving contact with the ground and to drive the motor 33 at constant preset speed and motor 16 at whatever speed is determined by the governor. An over-riding manual relief valve 71 enables the driver to bring the ram 53 out of operation, for the control wheel 46 to be raised to inoperative position by the spring 52, when it proves desirable to keep the motor 18 and pump 17 operating without spreading taking place.

The mounting of the bracket 41 enables the control wheel 46 to move substantially along the axis of its axle 45 as the vehicle turns or slips, so that slip does not occur, to any detrimental extent, between the control wheel and the ground, and the motor 16 drives the material feed means 15, 26 strictly in accordance with the general rate of travel of the vehicle. Accordingly, the density of distribution of the material can be maintained at the predetermined optimum density under any road, weather and traffic conditions.

The manual relief valve 71 can be linked readily to a control lever (or the like) in the cab of the lorry.

The mounting of the control wheel 46 on the cantilever axle 45 from the single leg 44 of the bracket 41 enables the wheel to be removed and replaced readily in the event of damage, e.g., a puncture, or after wear, without removal of any other parts being necessary.

Figure 8:
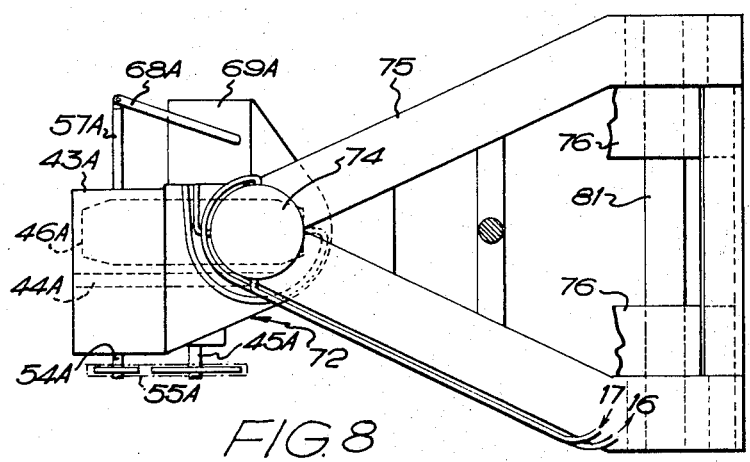
FIGURE 8 is a plan of part of FIGURE 7.

If a hopper vehicle with built-in discharging means is to be provided with control means according to the invention, the parts carried by the brackets 38 may be omitted and replaced by the parts shown in FIGURES 7 to 9, in which the control wheel 46A is mounted on a cantilever axle 45A from a single leg 44A of a castor mounting 72. The castor mounting has a swivel 73 in a banjo block 74 on the lower end of a swinging arm 75 of a bracket 76, the swivel and banjo block providing permanently communicating pairs of ports 77, 78 and 79, 80 between a control valve 69A and the hydraulic pump 17, and between the control valve and the motor 16 driving the conveyor belt 15. The bracket 76 is fixed to the chassis 36A of the vehicle and the swinging arm 75 is connected to the bracket by an axle 81 parallel to the axles of the back wheels 37A of the vehicle, with a hydraulic ram 53A connected between the bracket and the arm for effecting lowering of the swinging arm against a return spring 52A within the ram cylinder. The castor mounting 72 also carries a governor 43A driven from the control wheel 46A by a chain drive 55A and with its output shaft 57A linked to an arm 68A actuating the control valve 69A.

It will be appreciated that similar reference numerals denote similar functioning of parts in FIGURES 7 and 8 as in the preceding figures. However, the castor mounting 72 enables the control wheel 46A actually to align itself with the general direction of movement of the vehicle at any instant, so that regardless of any skidding of the vehicle or any other change in its direction of travel, the discharging means is driven strictly in accordance with the general rate of travel of the vehicle, and accordingly, the density of distribution of the material can be maintained at the precise predetermined optimum density under any road, weather and traffic conditions.

What I claim is:

1. In or for a hopper vehicle with discharging means for spreading discrete material over road or other ground surfaces, control means comprising a control wheel, a mounting for the control wheel permitting limited transverse movement of the control wheel with respect to the vehicle in response to other than straight forward movement of the vehicle, means for urging the control wheel resiliently into contact with ground surfaces during spreading, independent drive means for the discharging means, and a governor driven by the control wheel and controlling the speed of the drive means for the discharging means.

2. Control means as in claim 1, wherein the control wheel is a castor wheel.

3. Control means as in claim 1, wherein the control wheel is on a transverse axis on a bracket mounted to afford freedom of movement of the control wheel substantially along that axis, with springs to urge the control wheel towards a control position.

4. Control means as in claim 1, wherein the control wheel is carried by a bracket to be raised to bring the control wheel clear of ground surface, when the vehicle is travelling without spreading, with spring-loading towards raised position and manually controlled means for providing a resilient urge against the spring-loading.

5. A hopper vehicle with discharging means for spreading discrete material over road or other ground surfaces, comprising a control wheel, a castor mounting for the control wheel, means for urging the control wheel resiliently into contact with ground surfaces during spreading, independent drive means for the discharging means, and a governor driven by the control wheel and controlling the speed of the drive means for the discharging means.

6. A hopper vehicle as in claim 5, wherein the drive means for the discharging means is a hydraulic motor, with a control valve actuated by the governor, and a pump driven by the engine of the vehicle and supplying power to the hydraulic motor.

7. A self-contained spreading unit for mounting on the platform of a lorry, for spreading discrete material over road or other ground surfaces, the unit comprising a hopper, discharging means from the bottom of the hopper, a control wheel, a mounting for the control wheel permitting limited transverse movement of the control wheel with respect to a lorry on which the unit is mounted in response to other than straight forward movement of the lorry, means for urging the control wheel resiliently into contact with ground surfaces during spreading, drive means for the discharging means, and a governor drivable by the control wheel and controlling the spread of the drive means for the discharging means.

8. A self-contained spreading unit as in claim 7, wherein a hydraulic motor drives the discharging means, with a control valve actuated by the governor, a pump supplies power to the motor, and an engine on the unit drives the pump.

9. A self-contained spreading unit as in claim 8, wherein the pump also supplies power to a hydraulic ram for providing the resilient urge on the control wheel, against spring return.

10. A self-contained spreading unit as in claim 7, wherein the discharging means includes a metering device feeding the material to a spreading device for distributing the material over a width exceeding the width of the metering device.

11. A self-contained spreading unit as in claim 7, wherein the discharging means includes a metering device comprising a conveyor belt forming the bottom of the hopper, an adjustable gate near the discharge end of the hopper, a spiked roller with blunt spikes for receiving material from the conveyor belt, and notched wipers for levelling off the material between the spikes.

12. A self-contained spreading unit for mounting on the platform of a lorry, for spreading discrete material over road or other ground surfaces, the unit comprising a hopper, a conveyor belt forming the bottom of the hopper, an adjustable gate near the discharge end of the hopper, a spiked metering roller with blunt spikes for receiving material from the conveyor belt, notched wipers for levelling off the material between the spikes, a spreading device for receiving material from the spiked metering roller and distributing the material over a width exceeding the width of the spiked roller, an engine on the unit, a hydraulic pump driven by the engine, a hydraulic motor for driving the conveyor belt and the spiked metering roller, a constant speed hydraulic motor for driving the spreading device, a control wheel, a mounting for the control wheel permitting limited transverse movement of the control wheel with respect to a lorry on which the unit is mounted in response to other than straight forward movement of the lorry, hydraulic means for urging the control wheel against a return spring, resiliently into contact with ground surfaces during spreading, and a governor drivable by the control wheel and controlling a control valve for the motor for driving the conveyor belt and the spiked metering roller.

13. A self-contained spreading unit as in claim 12, wherein the spreading device consists of two discs rotatable about vertical axes and provided with vanes for directing the material centrifugally beyond the edges of the discs, the spiked roller discharging into chutes for directing the material on to the spreading discs at the optimum position.

14. A self-contained spreading unit as in claim 12, wherein the lower edges of the sides of the hopper diverge towards the discharge end.

References Cited

UNITED STATES PATENTS

| | | | |
|---|---|---|---|
| Re. 25,713 | 1/1965 | Tyler | 239—674 X |
| 2,243,983 | 6/1941 | Shaw | 239—685 |
| 2,244,480 | 6/1941 | Arndt | 239—685 X |
| 2,672,762 | 3/1954 | Northcote | 239—685 X |
| 3,019,025 | 1/1962 | Young | 239—685 X |

FOREIGN PATENTS 491,263    3/1953    Canada.

ALLEN N. KNOWLES, *Primary Examiner.*

V. C. WILKS, *Assistant Examiner.*